United States Patent [19]

Felker et al.

[11] Patent Number: 4,896,315
[45] Date of Patent: Jan. 23, 1990

[54] APPARATUS AND METHOD FOR DETERMINING NETWORK COMPONENT LOCATIONS ON A LOCAL AREA NETWORK SYSTEM CABLE SEGMENT

[75] Inventors: Michael A. Felker, Rio Rancho, N. Mex.; Chang J. Wang, Nashua, N.H.; Angelo N. Viverito, Albuquerque, N. Mex.; John W. Gilstrap, Albuquerque, N. Mex.; Jesus J. Martos, Tijeras, N. Mex.

[73] Assignee: Digital Equipment Corporation, Maynard, Mass.

[21] Appl. No.: 123,890

[22] Filed: Nov. 23, 1987

Related U.S. Application Data

[63] Continuation-in-part of Ser. No. 76,724, Jul. 23, 1987, Pat. No. 4,799,211.

[51] Int. Cl.[4] .................................................. H04J 1/16
[52] U.S. Cl. ...................................... 370/17; 178/2 R; 375/36
[58] Field of Search ................ 370/13, 17, 85; 379/24, 379/30, 969, 290; 178/2 R; 340/825.5; 375/31, 36; 324/52

[56] References Cited

U.S. PATENT DOCUMENTS

| | | | |
|---|---|---|---|
| 3,305,647 | 2/1967 | Sheffet | 379/24 |
| 4,006,319 | 2/1977 | Gartner | 379/24 |
| 4,683,471 | 7/1987 | Blackstone | 370/85 |
| 4,694,453 | 9/1987 | Kobayashi et al. | 370/85 |
| 4,751,724 | 6/1988 | Amadio et al. | 379/24 |

Primary Examiner—Joseph A. Orsino
Assistant Examiner—Frank M. Scutch, III
Attorney, Agent, or Firm—William W. Holloway; T. Carter Pledger

[57] ABSTRACT

Apparatus and method are disclosed for determining the location of a network component coupled to a local area network segment. A remote segment monitor unit is coupled to either end of a cable segment of a local area network system. The remote segment monitor unit, for each transaction on the cable segment, determines a value related to the transaction signal strength and determines the identity of the network node from which the transaction originated. By providing a record of the transaction signal strength associated with each network node (component) in both remote segment monitors, the location of network nodes can be ascertained.

18 Claims, 5 Drawing Sheets

APPARATUS AND METHOD FOR DETERMINING NETWORK COMPONENT LOCATIONS ON A LOCAL AREA NETWORK SYSTEM CABLE SEGMENT

This is a continuation-in-part of copending application Ser. No. 07/076,724 filed on July 23, 1987, now Pat. No. 4,799,211.

BACKGROUND OF THE INVENTION

1. Field of the Invention

This invention relates generally to local area networks (LANs) and more particularly to apparatus and to a method for determining the location of a network node or component from the interaction of the network node with the local area network.

2. Description of the Related Art

For certain types of local area networks, such as the Carrier Sense Multiple Access/Collision Detect (CSMA/CD) architecture, as defined by the IEEE 802.3, a multiplicity of devices can be coupled to a (cable) segment of the local area network. For example, a segment can consist of a coaxial cable segment 500 meters in length. A local area network can include a plurality of cable segments, each cable segment coupled by a repeater unit (to compensate losses experienced by propagation along the cable) to other cable segments and each cable segment having up to 1024 system members coupled thereto. The system members are coupled to the coaxial cable by means of a device typically referred to as a tap. The tap is a unit that clamps onto the coaxial cable, pushes aside the braided grounding wire, and forces a small pin into the central conducting element to detect signals transmitted on the central conducting element. Referring now to FIG. 1, the typical configuration of a system member coupled to the cable segment is shown. The tap and transceiver unit 12 are coupled to the coaxial cable segment 11. The tap portion physically couples to cable segment, while the transceiver portion encodes signals that are going to be applied to the cable segment 11 in the specified local area network format and decodes signals received from the cable segment 11. The network interconnect unit 14 is coupled to the tap and transceiver unit 12 and provides the data link protocols specific to the local area network. The network interconnect unit 14 typically provides power for the tap and transceiver unit 12 through the same conducting leads that carry the signals. The network interconnect unit 14 is typically contained within a data processing system 15, the data processing system 15 being generally referred to as a network node.

Data is transferred between local area network system members over at least one cable segment. The data is typically transferred in groups of signals referred to as packets. The packets, in addition to the information conveyed therein, include a plurality of identifying fields such as a field identifying the source local area network system member and a field identifying the target local area network member. The presence of the field specifying the source of the data packet in the packet itself is important to the operation of the invention disclosed herein.

Because the length of the cable segment cam make visual inspection inconvenient or impossible and because the ease of moving the network components limits the usefulness of an inventory of network locations of systems members, a need has therefore been felt for apparatus and for a method that can determine the location of network components automatically form apparatus coupled to the local area network.

FEATURES OF THE INVENTION

It is an object of the present invention to provide an improved local area network.

It is a feature of the present invention to provide a technique for determining the location of a network component coupled to the cable segment of the local area network.

It is another feature of the present invention to provide a technique for automatic determination of a location of a network component coupled to cable segment of a local area network.

It is yet another feature of the present invention to provide devices coupled to both ends of cable segment of a local area network that can measure signal parameters transmitted over the cable segment and that can be used to determine a location of a network component coupled to the cable segment.

It is a still further feature of the present invention to provide a technique for determining a location of a network component coupled to a cable segment of a local area network using only signals transmitted over the cable segment.

SUMMARY OF THE INVENTION

The aforementioned and other features are accomplished, according to the present invention, by positioning remote segment monitor units that sample and store signal parameters (e.g., related to the voltage level of the transaction) associated with each transaction on the cable segment of a local area network at both ends of the cable segment. For each transaction, the remote segment monitor units decode the preamble (or header) information to identify the network system member from which the transaction originated. When the transaction origin is identified and the transaction is valid, then the signal parameters are stored together with the identification of the associated system member originating the transaction in both remote segment monitor units. The information in the remote segment monitor unit is stored in such a manner that the location of network components can be determined by comparison of the signal parameters, associated with each system member for the same transaction, in the two remote segment monitor units.

These and other features of the present invention will be understood upon reading of the following description along with the drawings.

DESCRIPTION OF THE PREFERRED EMBODIMENT

1. Detailed Description of the Figures

Figure 1:
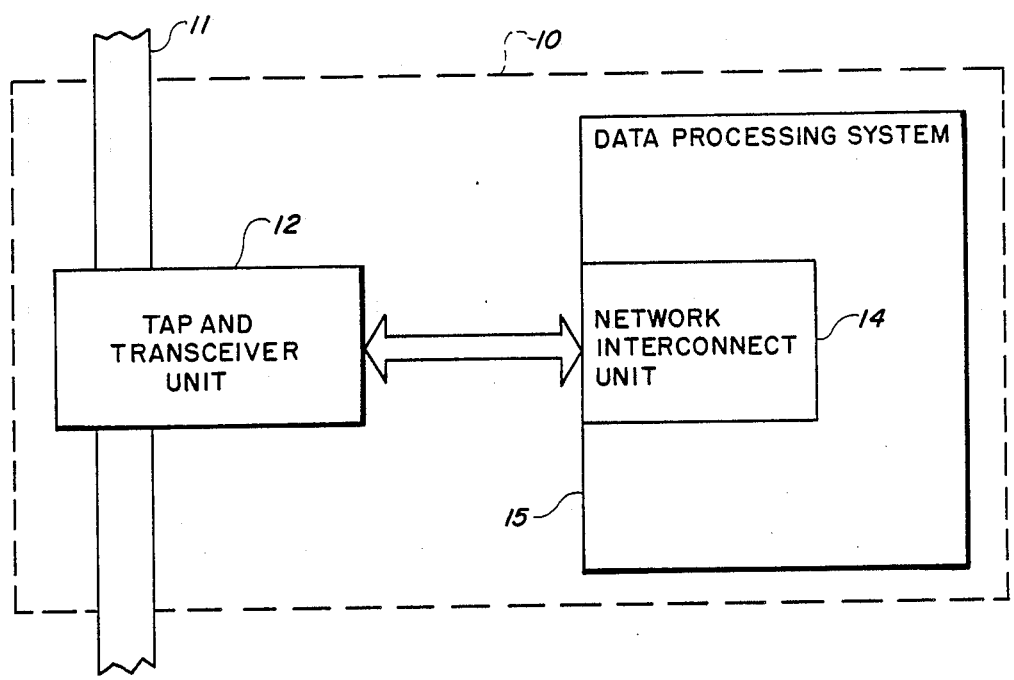
FIG. 1 is a block diagram of a local area network system member coupled to the cable segment.

FIG. 1 has been described with reference to the related art.

Figure 2:
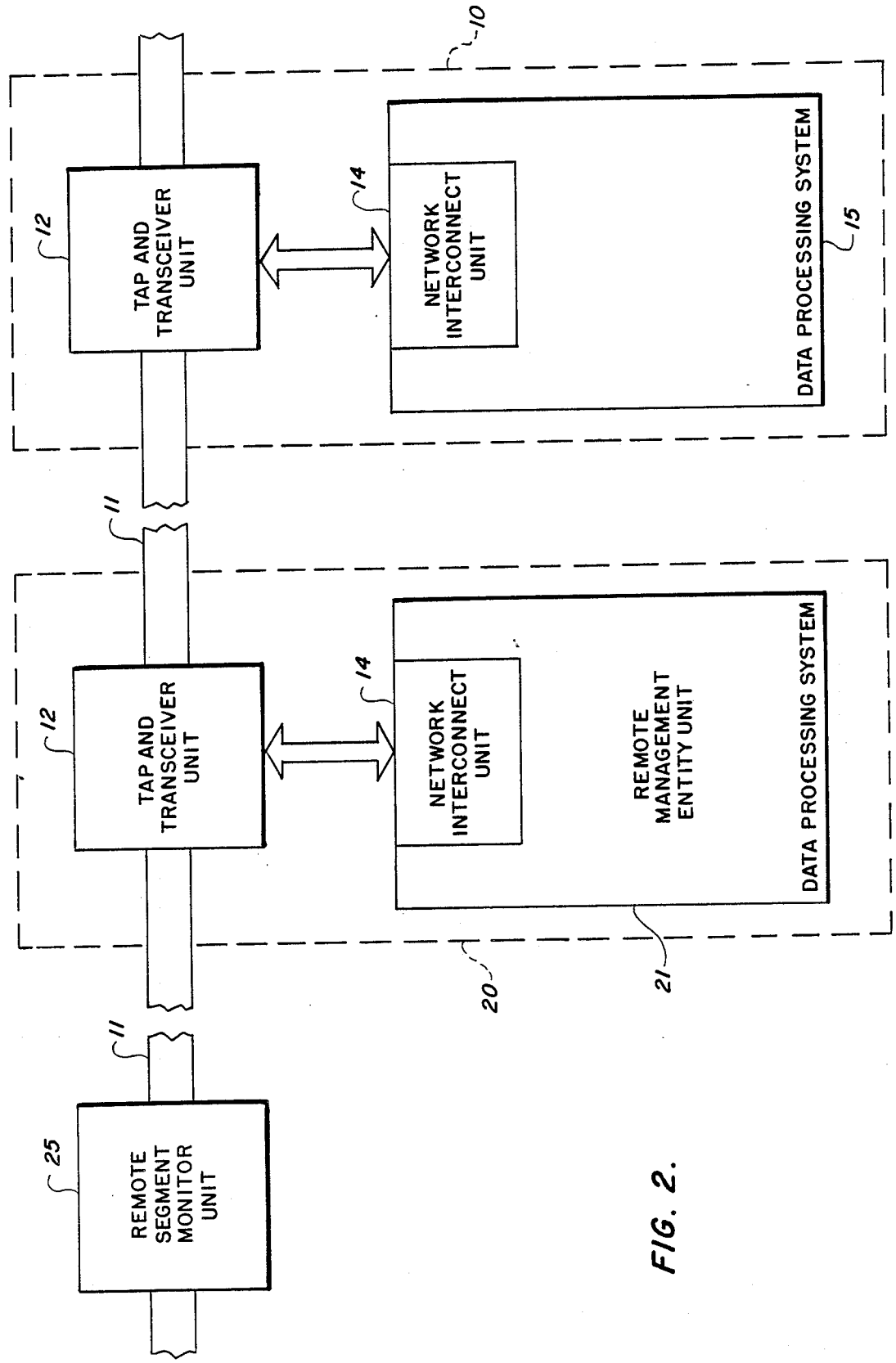
FIG. 2 is a block diagram of the principal components of the signal analyzing network of the present invention.

FIG. 2 illustrates the relationship of the components of the local area network signal analyzing network of the present invention. A plurality of system members 10 (each system member 10 typically including a tap unit and transceiver unit 12, a network interconnect unit 14 and a data processing system 15) are coupled to cable segment 11, the cable segment 11 providing the communication path between the system members 10. One system member 20, has a data processing system referred to as a remote management entity unit 21. Finally, the cable segment 11 of the local area network has two remote segment monitor units 25 coupled thereto. Each remote segment monitor unit 25 stores data related to transactions occurring over the cable segment 11. This stored data is periodically transferred to the remote management entity unit 21, wherein the data is analyzed and properties related to the transaction sources (or intervening apparatus such as cable segment repeaters) can be analyzed.

Figure 3:
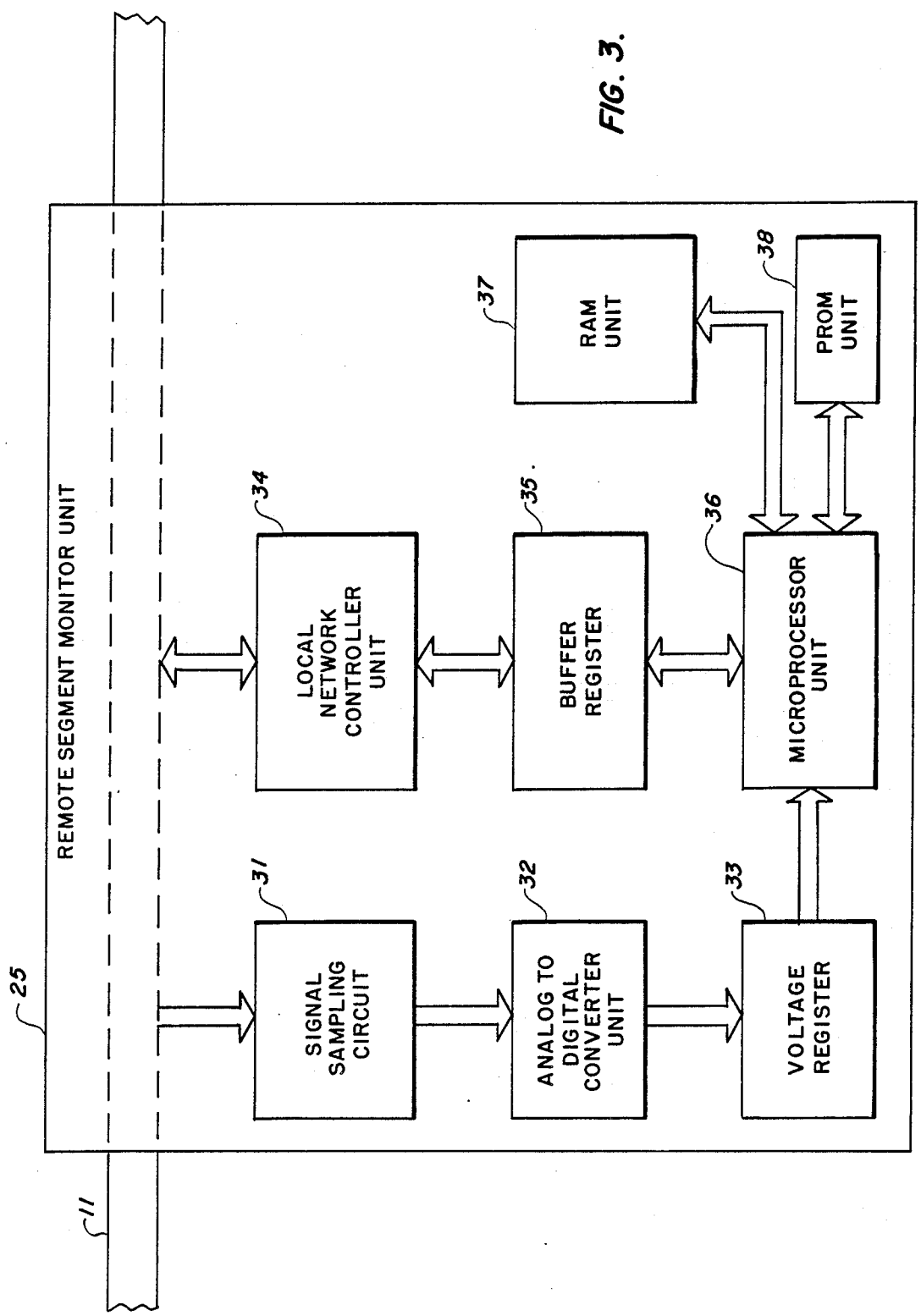
FIG. 3 is a block diagram of a remote segment monitor unit according to the present invention.

Referring next to FIG. 3, a block diagram of the components of the remote segment monitor unit 25, according to the present invention, is shown. A signal sampling circuit 31 receives signals from the cable segment 11 and applies the sampled signals to the analog to digital converter unit 32. The digitalized signals from the analog to digital converter unit 32 are applied to and stored (temporarily) in voltage register 33. The local area network controller unit 34 receives signals from and applies signals to the cable segment 11. The buffer register unit 35 applies signals to and receives signals from the local area network controller unit 34. The buffer register unit 35 also transfers signals to and receives signals from the microprocessor unit 36. The microprocessor unit 36 can receive signals from the voltage register 33, can receive signals from the PROM (programmable read only memory) unit 38 and can exchange signals with the RAM (random access memory) unit 37.

Figure 4:
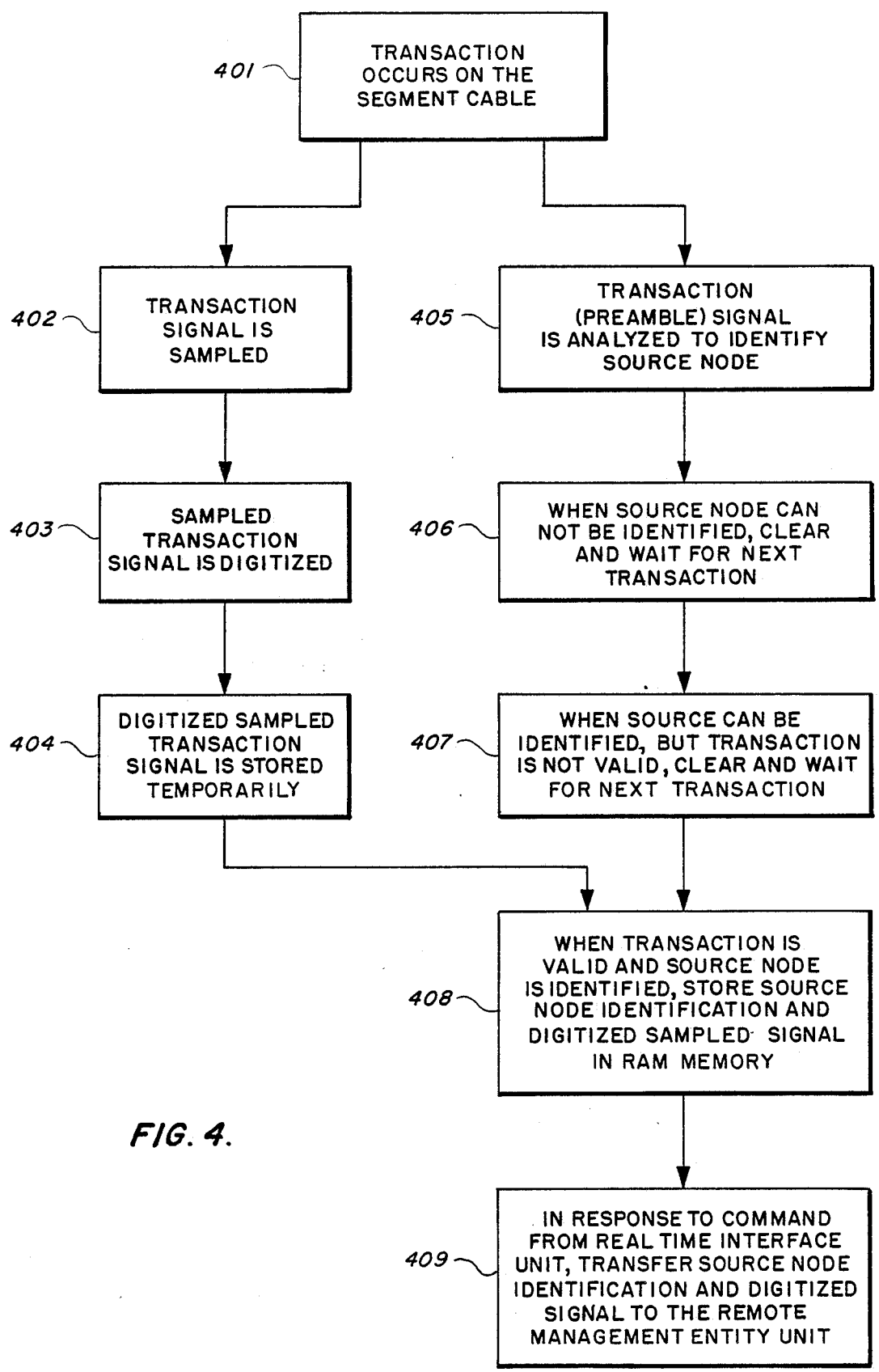
FIG. 4 is a flow diagram illustrating the operation of the remote segment monitor unit.

Referring next to FIG. 4, a flow diagram illustrating the operation of the remote segment monitor unit 25 is shown. In step 401, a transaction occurs on the cable segment 11. As a result of the presence of a transaction signal on the cable segment 11, the transaction signal voltage level is sampled in step 403. The sampled transaction signal is digitized in step 403, and in step 404, the digitized, sampled transaction signal is temporarily stored (i.e., in voltage register 33). Simultaneously, the preamble or header of the transaction is being decoded and the node originating the transaction is identified in step 405. In step 406, when the source node can not be identified, then the procedure is terminated and the digitized sampled and stored transaction signal is not used. When the source node can be identified, but the transaction is not valid (e.g., as the result of a collision), then the procedure is terminated and digitized, sampled and stored signal is not used in step 407. When the transaction is valid and the source node can be identified, then the source node of the transaction and the associated sampled and digitized signal are stored in a memory in such a RAM manner that the source node identification and the stored transaction parameter are coupled instep 408. In response to a command from the remote management entity unit 21, the files of source node identification signals and parameter signals associated with each transaction are transferred to the remote management entity unit 21 for processing in step 409.

Figure 5:
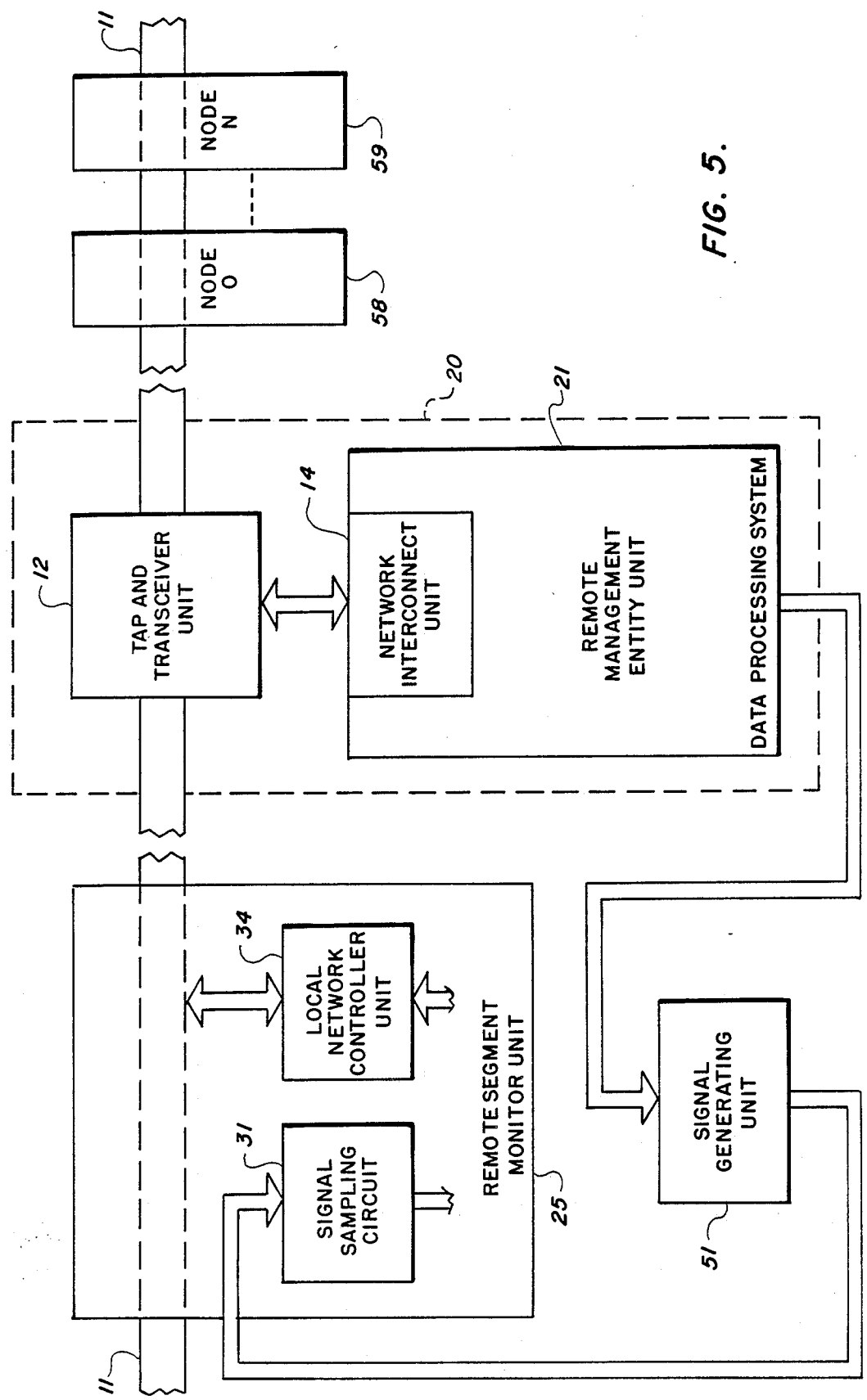
FIG. 5 is a block diagram of components coupled to the cable segment which are used to illustrate the operation of the present invention.

Referring next to FIG. 5, a block diagram of the configuration of the present invention for determination of the location of system network components is shown. The cable segment 53 is illustrated as being L in length and having a multiplicity of components coupled thereto. A remote segment monitor 51 is coupled to a first end of the cable segment 53, while a remote segment monitor 52 is coupled to a second end of cable segment 53. N local area network nodes, node/O 58 through node/N-1 59, including node/D 60, are coupled to the cable segment 53 typically at unspecified locations. By way of example, node/D 60 is located at a distance X from remote segment monitor unit 51 and at a distance L-X from remote segment monitor unit 52. In addition to the node network components, one or more repeater units 54 can be coupled to the cable segment 53, a repeater unit being apparatus that transfers signals from a different cable segment to cable segment 53. Also concentrator units 55, which couple a plurality of nodes (node/U 56 and node/V 57 are illustrated) to the cable segment 53, can be present. From the perspective of the present invention, the operation of the repeater units and concentrator units are equivalent to the operation of the cable segment nodes.

2. Operation of the Preferred Embodiment

The operation of the remote segment monitor unit 25 can be understood in the following manner. When a transaction is placed on cable segment 11, the remote segment monitor unit 20 samples the magnitude of the transaction signal by means of signal sampling circuit 31. The sampled signal is applied to analog to digital converter unit 32 to obtain a digitized value proportional to the strength of the (sampled) transaction signal. This value is stored in a voltage register 33. Simultaneously, the local network controller unit 34 decodes the transaction signal to the extent that the node from which the transaction originated, encoded in the preamble or header of the signal packet, can be identified. The preamble will also contain information, such as the identification of the destination node and the transaction message, which is ignored by the local network controller unit 34. In the preferred embodiment, the local network controller unit 34 is a specialized processor unit for decoding signals from the cable segment 11 and storing the decoded signals in the buffer register 35 and for taking signals in the buffer register, encoding the signals in a proper format and applying the signals with proper protocols to the cable segment 11. For the operation of the current invention, the local network controller unit 34 stores in the buffer register 35 only that portion of the decoded transaction that identifies the originating node of the transaction (and a transfer data instruction described below). When the source node has been identified, and the transaction is determined to be a valid one (e.g., no collision between transactions is detected), then the source identification is transferred to the microprocessor unit 36. The microprocessor unit 36 transfers the value in the voltage register 33 to the RAM unit 37 is such a manner that the voltage register value is associated with the transaction source identification.

The remote management entity unit node 10 periodically transfers to the microprocessor units 36 of each remote monitor unit 25 a transfer data instruction. This instruction causes the microprocessor unit 36 to retrieve the stored signal values from the RAM unit 37 and transfer this data, via the buffer register 35 and the local network controller unit 34 to the remote management entity unit 21 for analysis.

After repeated transfers of data from the remote segment monitor unit 25 to the remote management entity unit 21, a history of the signal (voltage) levels for each node (data processing system) is available. The values for each signal can be compared over a period of time and analyzed. The analysis can detect degrading signals and wildly varying signals. A degrading signal can be the result of one of the following conditions:

1. Failing transceiver unit circuitry
2. A tap unit is becoming loose or is oxidizing.
3. A failing network interconnect unit. (The transceiver unit is powered by the network interconnect unit, so that failure of the transceiver apparently originate in the interconnect unit).
4. Bad transceiver cabling. (The power for the transceiver unit from the interconnect unit travels over the cable as do the data and collision signals).

By analyzing the data detected by the remote segment monitor unit 25 in the remote management entity unit 21, the functionality of the remote segment monitor unit 25 can be kept to a minimum. The limited functionality is important because a plurality of remote segment monitor units may be used to monitor a multi-segment local area network. A single remote management entity unit 21 can be used in conjunction with the plurality of remote segment monitor units.

The determination of the location of node/D 60 (cf. FIG. 5) can be understood in the following manner. Both remote segment monitors 51 and 52 associate a average signal strength with the identification of the source of the signals identified by the signal preamble. If $P_1$ is an average signal strength measured by remote segment monitor unit 51 for signals applied to cable segment 53 by node/D (60) having an average signal strength $P_{node/D}$ and $P_2$ is the average signal strength for a signal received by remote segment monitor unit 52 for the same signals applied to cable segment 53, then:

$$P_1 = P_{node/D} - R*X*P_{node/D} \text{ and}$$

$$P_2 = P_{node/D} - R*(L-X)*P_{node/D}.$$

where R is the cable segment signal loss per unit length. Therefore, $$P_1 - P_2 = R*(L - 2X)*P_{node/D}.$$

When the remote segment monitor unit can measure its own signal strength, then $$P_1 - P_2 = R*(L)*P_1,$$

and, assuming that the detection capability of the two remote segment monitor units is the same, then the constant R can be determined. (Referring to signal sampling circuit 31 and local area controller network 34 of FIG. 3, these components are separately coupled to the system bus 11 permitting measurement by the device of signals applied to the system bus). If the detection capability of the two remote segment monitor units is not the same, then $$P_2 - P_1 = R*(L)*P_2$$

can be measured. In this situation, the constant R has a different (although determinable) value for signal flows in the two cable segment directions and has embedded therein the difference in the detector sensitivity of the two remote monitor units. The complete equation set will be:

$$P_1 = P_{node/D} - R_1*X*P_{node/D} \text{ and}$$

$$P_2 = P_{node/D} - R_2*(L-X)*P_{node/D}.$$

These two equations have two unknown variables, X and $P_{node/D}$ and therefore the distance X can be calculated.

As indicated above, in the preferred embodiment the remote segment monitor units 25 serve as a temporary storage device, the actual computations being performed in the remote management entity unit after the accumulated data is transferred thereto. The algorithms implementing the foregoing equations are implemented in software programs that are executed in the remote management entity unit 21. It will also be clear that one remote management entity unit 21 can be used for a plurality of cable segments. However, the characteristics of repeater units require that each cable segment have two remote segment monitors associated therewith. The position of the remote segment monitor units in the preferred embodiment is at either end, however, it will be clear that the distance between the remote segment monitors coupled at known locations on the cable segment 53 is the important parameter for identifying the location of a system member.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for determining a location on a local area network cable segment of a device applying signals thereto, said apparatus comprising:
   first means located at a first position of said cable segment for measuring and storing signal strengths on said cable segment and associating an issuing device identification with each set of signals;
   second means located at a second position of said cable segment for measuring and storing signal strengths on said cable segment and associating an issuing device identification with each set of signals; and
   processing means coupled to said local area network for receiving said stored signal strengths and associated issuing device identifications from said first and said second means applied to said segment cable in response to a signal group from said processing means, said processing means including:
   a first procedure for determining an attenuation constant for said cable segment from said first and said second means stored signal strengths and said associated issuing device identifications; and
   a second procedure for comparing attenuated signal strengths in relationship in said attenuation constant for sets of transaction signals issued from a selected device, said comparison providing a location of said selected device.

2. The device location determination apparatus of claim 1 wherein said first means includes apparatus for determining a signal strength of transaction signals applied by said first means to said cable segment.

3. The device location determination apparatus of claim 1 wherein said first and second means include apparatus for decoding and storing an issuing unit identification transmitted with each set of transaction signals.

4. The device location determination apparatus of claim 1 wherein said first position is approximately at one end of said cable segment and said second position is approximately at a second end of said cable segment.

5. A method for determining a location of a device applying transaction signals to a local area network, said method comprising the steps of:
measuring signal strengths of said transaction signal applied by said device at two locations on a cable segment to which said device is coupled, wherein a distance between said two locations is known;
measuring a signal strength of a first transaction signal at said first location and at said second location, wherein said first transaction signal is applied at said first location; and
determining a location of said device using said first transaction signal strengths and said transaction signal strengths.

6. The method for determining a device location of claim 5 wherein said determining a location step includes a step of determining a first attenuation constant.

7. The method for determining a device location of claim 6 further comprising the step of measuring a signal strength of a second transaction signal applied to said second location at said second location and at said first location, said second location signal strength measuring step permitting determination of a second attenuation constant.

8. The method for determining a device location of claim 7 further comprising a step positioning said first and said second locations for measuring transaction signal strengths substantially at two ends of said cable segment.

9. The method for determining a device location of claim 8 further comprising a step of associating with each measured transaction signal a device identification number.

10. The method for determining a device location of claim 9 further comprising a step of transferring said measured transaction signal strengths and first transaction signal strengths along with associated identification numbers to a data processing unit, said determining step performed by said data processing unit.

11. Apparatus for determining a location of a selected device applying transaction signals to a cable segment of a local area network, said cable segment having a plurality of devices coupled thereto, said apparatus comprising:
a first and a second remote segment monitor unit, each of said monitor units including;
measuring means for measuring signal strengths of transaction signals applied to said segment cable,
detection means for detecting an identification number associated with transaction signals applied to said cable segment,
storage means for storing said signal strengths and said identification number, and
signal means for applying transaction signals to said cable segment; wherein said first and second monitor units are separated by a known distance; and
processing means coupled to said first and said second monitor unit for determining a location of said selected device, wherein said selected device is identified by a selected identification number.

12. The apparatus for determining a location of a selected device of claim 11 wherein said processing means is a local area network member, wherein said monitor units transfer said stored signal strengths and said identification numbers to said local area network member for determination of said selected device location.

13. The apparatus for determining a location of a selected device of claim 12 wherein said processing means includes a program responsive to said stored signal strengths and said identification numbers for determining at least one cable segment attenuation constant.

14. The apparatus for determining a location of a selected device of claim 13 wherein said processing means is coupled to a cable segment different from said cable segment to which said selected device is coupled.

15. The apparatus for determining a location of a selected device of claim 13 wherein differences in measuring sensitivities of said first and said second monitor units are in said attenuation constants.

16. The apparatus for determining a location of a selected device of claim 13 wherein said first and said second monitor units are positioned at substantially each end of said cable segment.

17. The apparatus for determining a location of a selected device of claim 13 wherein said stored signal strengths and said identification numbers permit said processing means to determine when said selected device is failing.

18. The apparatus for determining a location of a selected device of claim 17 wherein said selected device is determined as failing as a result of comparison of said associated signal strengths as a function of time.

* * * * *